(12) United States Patent
Nagata

(10) Patent No.: US 8,218,084 B2
(45) Date of Patent: *Jul. 10, 2012

(54) SIGNAL SEPARATOR

(75) Inventor: Mitsutoshi Nagata, Obu (JP)

(73) Assignee: DENSO CORPORATION, Kariya (JP)

( * ) Notice: Subject to any disclaimer, the term of this patent is extended or adjusted under 35 U.S.C. 154(b) by 1328 days.

This patent is subject to a terminal disclaimer.

(21) Appl. No.: 11/889,800

(22) Filed: Aug. 16, 2007

(65) Prior Publication Data

US 2008/0088738 A1 Apr. 17, 2008

(30) Foreign Application Priority Data

Oct. 11, 2006 (JP) .................................. 2006-277789

(51) Int. Cl.
  *H04N 9/77* (2006.01)
  *H04N 9/78* (2006.01)

(52) U.S. Cl. ........ 348/663; 348/664; 348/665; 348/666; 348/667; 348/668; 348/669; 348/670

(58) Field of Classification Search .................. None
See application file for complete search history.

(56) References Cited

U.S. PATENT DOCUMENTS

| | | | |
|---|---|---|---|
| 4,694,331 A * | 9/1987 | Law et al. ..................... | 348/666 |
| 5,025,311 A | 6/1991 | Hosoi | |
| 5,047,866 A * | 9/1991 | Watanabe et al. ............. | 386/269 |
| 5,099,315 A * | 3/1992 | Koga et al. ................... | 348/665 |
| 5,909,255 A | 6/1999 | Hatano | |
| 2006/0077302 A1 | 4/2006 | Nieuwenhuizen | |
| 2008/0088738 A1 | 4/2008 | Nagata | |
| 2008/0088745 A1 | 4/2008 | Nagata | |

FOREIGN PATENT DOCUMENTS

| | | |
|---|---|---|
| JP | A-S61-41290 | 2/1986 |
| JP | A-61-191189 | 8/1986 |
| JP | A-S64-19891 | 1/1989 |
| JP | A-04-087495 | 3/1992 |
| JP | A-H8-242464 | 9/1996 |
| JP | A-9-163398 | 6/1997 |

OTHER PUBLICATIONS

Office Action dated Apr. 27, 2009 from German Patent Office in the corresponding DE Application No. 102007000716.9 (and English Translation).

Office Action dated Apr. 23, 2009 from German Patent Office in the corresponding DE Application No. 102007000715.0 (and English Translation).

(Continued)

*Primary Examiner* — Kristine Kincaid
*Assistant Examiner* — James Marandi
(74) *Attorney, Agent, or Firm* — Posz Law Group, PLC

(57) ABSTRACT

A signal separator for separating luminance and color signals from a composite video signal includes: a first line delay element for delaying the composite video signal by one line period; a second line delay element for delaying the composite video signal by two line periods; an adder element for adding the first and second delay signals; a subtraction element for subtracting the second delay signal from the first delay signal; a control signal generator for passing a part of the addition signal within a predetermined frequency band therethrough; and a gain control element for reducing a level of the subtraction signal based on the control signal.

1 Claim, 4 Drawing Sheets

OTHER PUBLICATIONS

Schonfelder, H.: Fernsehtechnik [Television Technology] Part 2, Justus Von Liebig Verlag (ed.), Darmstadt, IDBN 3873900432, 1973, pp. 12/13B, 12/14B, 12/14, 12/15B, 12/15 (and English Translation).
U.S. Appl. No. 11/889,801, filed Aug. 16, 2007, Nagata.
Office Action mailed Aug. 16, 2011 in corresponding JP application No. 2006-277789 (and English translation).
Written Directive mailed Aug. 16, 2011 in a related Japanese application No. 2006-277788.
Notification of Reason of Refusal mailed Aug. 16, 2011 in corresponding Japanese application No. 2006-277788.
Office Action mailed Jun. 24, 2011 in corresponding U.S. Appl. No. 11/889,801.
Office Action mailed on Dec. 27, 2011 from the US Patent Office issued in related U.S. Appl. No. 11/889,801.

* cited by examiner

SIGNAL SEPARATOR

CROSS REFERENCE TO RELATED APPLICATIONS

This application is based on Japanese Patent Application No. 2006-277789 filed on Oct. 11, 2006, the disclosure of which is incorporated herein by reference. This application is also related to U.S. application Ser. No. 11/889,801, entitled "SIGNAL SEPARATOR", filed simultaneously on Aug. 16, 2007 with the present application.

FIELD OF THE INVENTION

The present invention relates to a signal separator.

BACKGROUND OF THE INVENTION

A television receiver requires separating a color signal and a luminance signal from a composite video signal. A simple method for separating the signals is, for example, a method with using a band pass filter (i.e., BPF) or a method with using a comb filter.

The method with using a BPF is described as follows. A composite video signal is input into the BPF. The color signal desired is an output signal of the BPF. The luminance signal desired is the subtraction result of the predetermined color signal from the composite video signal. Here the BPF has the ability that the BPF passes only a signal component within a color-signal-band. The method with using a comb filter is described as follows. The luminance signal desired is the addition result between a one-line-delayed composite video signal and a non-delayed composite video signal. The color signal desired is the subtraction result of the one-line delayed composite-video-signal from the non-delayed composite video signal. Here, the separation is executed with using the information on a phase correlation between the lines.

The two methods mentioned above are easy to perform but result in quality losses of videos such as that due to cross color and dot interference.

An addition of a field memory and a complicated circuit on a display is a method for improving the video quality loss. An example is shown in JP-A-H09-163398, in which the following technique is presented. Output signals of the field delay circuit and the line delay circuit are input into filters. Then output signals of these filters are to be desired signals by selecting the output signals. The selection of the output signals is made based on the decorrelation-detection-result obtained by limiting a band in relation to time, vertical, and horizontal components.

An application of a complicated circuit exampled in JP-A-H09-163398 to a small display such as a vehicle display and a mobile display, however, leads to display devices having a much bigger sized circuit than its screen size. Moreover, some information losses of a video signal may not be relevant to an actual video quality for audiences in use in taking into account the screen area of the display. An application of the large circuit exampled in JP-A-H09-163398 to the small display provides an overmuch resolution in use. The small display having a complicated circuit exampled in JP-A-H09-163398 poses problems of a non-suitable sized circuit for the display and the overmuch resolution in use. Thus, what is required is a signal separator without having a large circuit. Further, it is required for the signal separator to provide an appropriate video quality with reducing quality loss such as that due to cross color and dot interference.

SUMMARY OF THE INVENTION

In view of the above-described problem, it is an object of the present disclosure to provide a signal separator.

According to an aspect of the present disclosure, a signal separator for separating a luminance signal and a color signal from a composite video signal includes: a first line delay element for delaying the composite video signal by one line period, and outputting a delayed signal as a first delay signal; a second line delay element for delaying the composite video signal by two line periods, and outputting a delayed signal as a second delay signal; an adder element for adding the first and second delay signals, and outputting an added signal as a addition signal; a subtraction element for subtracting the second delay signal from the first delay signal, and outputting a subtracted signal as a subtraction signal; a control signal generator for passing a part of the addition signal within a predetermined frequency band therethrough, and outputting a filtered signal as a control signal; and a gain control element for reducing a level of the subtraction signal based on the control signal, and outputting a reduced signal as a gain-controlled signal.

According to the above separator, the level of the subtraction signal is reduced when a part of the addition signal includes a signal component within the predetermined frequency band. The separator provides an appropriate video quality without having a large circuit.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS (First Embodiment)

Figure 1:
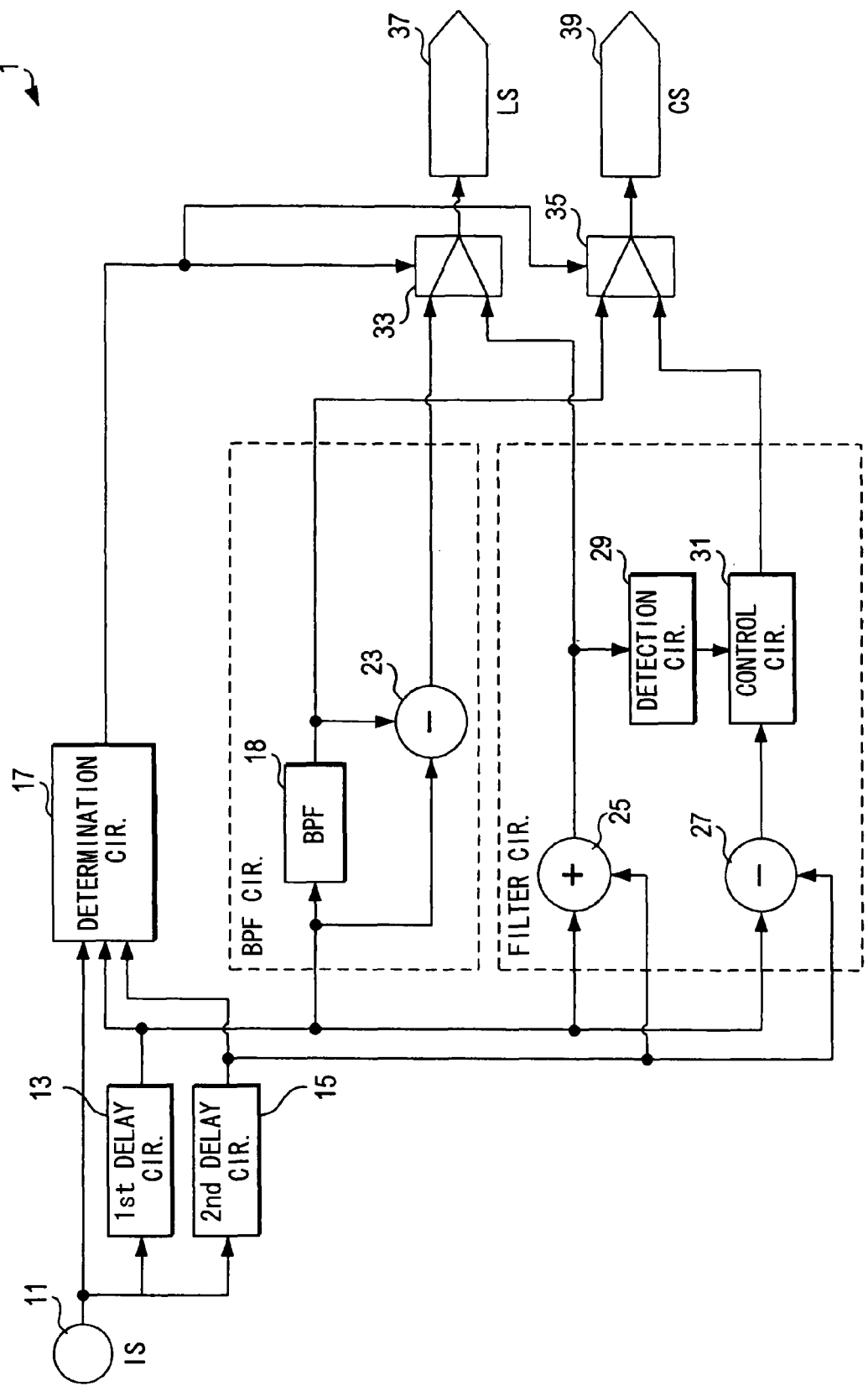
FIG. 1 is a schematic block diagram of a signal separator 1 according to a first embodiment.

FIG. 1 shows a schematic block diagram of a signal separator 1. A signal-input-terminal 11 is inputting a NTSC-standard composite-video-signal IS (i.e., input signal) including a color-signal and a luminance-signal into the separator 1. The composite-video-signal input through the signal-input-terminal 11 is output to a first line-delay-circuit 13, a second line-decay-circuit 15 and a correlation-determination-circuit 17.

The first line-delay-circuit 13 delays the composite-video-signal by one line period. The one-line-delayed composite-video-signal is output to the correlation-determination-circuit 17, a BPF 18, an adder-circuit 25, a first subtracting-circuit 23 and a second subtracting-circuit 27.

A second line-delay-circuit 15 delays the composite-video-signal by two line periods. The two-line-delayed composite-video-signal is output to the correlation-determination-circuit 17, the adder-circuit 25 and the second subtracting-circuit 27.

The correlation-determination-circuit 17 executes a correlation determination among the composite-video-signal, the one-line-delayed composite-video-signal and the two-line-delayed composite-video-signal. Then the correlation-determination-circuit 17 outputs a switching-signal to a first selector 33 and a second selector 35. Here, a switching signal "ON" is output when the correlation among the above signals exceeds a threshold value, and a switching signal "OFF" is output when the correlation does not exceed the threshold value. The threshold value is adjusted based on the videos that are produced by color-signals and luminance-signals, where the color signal CS and luminance signal LS are output from a color-signal-output-terminal 39 and a luminance-signal-output-terminal 37, respectively.

The one-line-delayed composite-video-signal is input into the BPF 18. The BPF passes only a signal component within a predetermined color-signal-band. The signal passed is output to a first subtracting-circuit 23 and the second selector 35. Here the frequency band of the color signal is in a range between 3 MHz and 4 MHz.

The first subtracting-circuit 23 executes a subtraction of the output signal of the BPF 18 from the one-line-delayed composite-video-signal. Here the output signal of the BPF has only a signal component within the color-signal-band. The signal subtracted is output to the first selector 33.

The adder-circuit 25 executes an addition between the one-line-delayed composite-video-signal and the two-line-delayed composite-video-signal. The signal added is output to the first selector 33.

The second subtracting-circuit 27 executes a subtraction of the two-line-delayed composite-video-signal from the one-line-delayed composite-video-signal. The signal subtracted is output to the second selector 35.

Figure 2A:
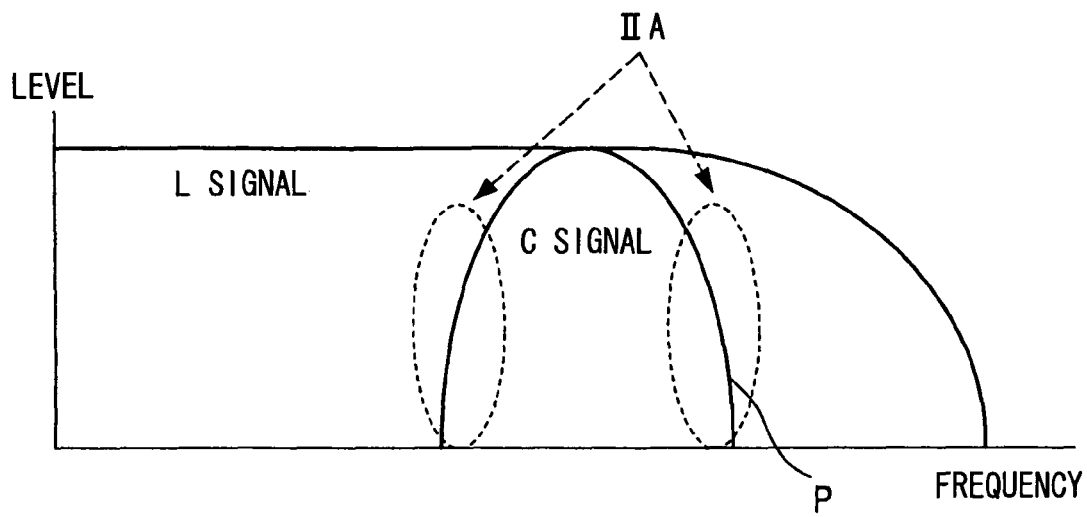
FIGS. 2A, 2B, 2C and 2D are graphs explaining characteristics of a frequency detection circuit.

The signal from the adder-circuit 25 is input into the frequency-detection-circuit 29. The frequency-detection-circuit 29 passes a signal component within a predetermined frequency band. Then the signal filtered is outputs to the gain-control-circuit 31. FIG. 2A illustrates levels of a composite-video-signal as a function of frequencies. As shown in FIG. 2A, the color signal is disposed in the specific frequency band and is superposed on the luminance signal (see a solid curve P in the FIG. 2A). Although a filtering of signals along with the curve P could separates the color signal and the luminance signal, it is difficult to execute a complete separation in a practical meaning because the color signal and luminance signal are mixed together on the region around the curve P. Moreover, as separation accuracy increases, circuits become more complicated. Here, the band where the two signals are mixed together shall be described as "the frequency bands of difficult separation" (that corresponds to IIA in FIG. 2A).

The frequency detection circuit 29 is described as the combination of a band pass filter (i.e., BPF) and a trap filter. Frequency characteristics of the BPF, the trap filter and the frequency detection circuit 29 are illustrated in FIG. 2B, FIG. 2C and FIG. 2D, respectively.

Figure 2B:
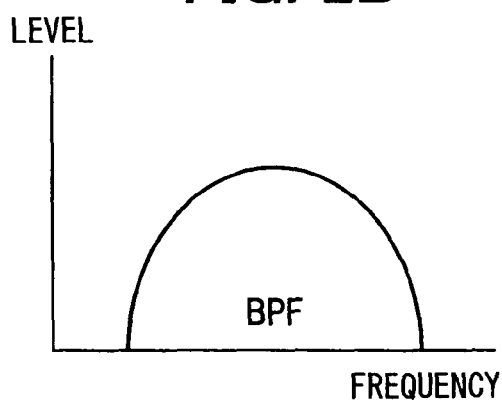

A frequency characteristic of the BPF illustrated in FIG. 2B is similar to that shown as the curve P in FIG. 2A. The trap filter having the characteristic shown in FIG. 2C dumps a specific frequency band. The band to be dumped partly overlaps the curve P in FIG. 2A.

Figure 2C:
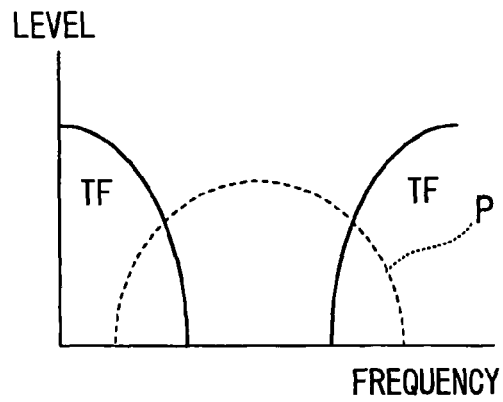
Figure 2D:
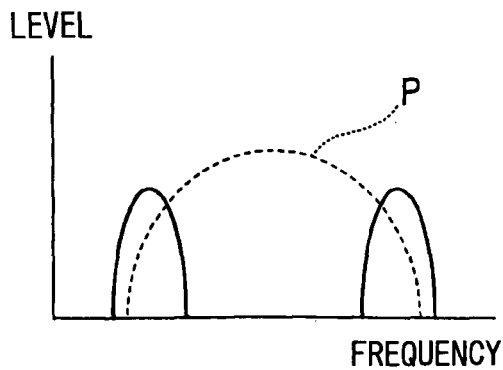

FIG. 2D shows a frequency characteristic of the combination circuit, which is described as the combination of the BPF shown in FIG. 2B and the trap filter shown in FIG. 2C. The combination circuit is able to pass only a signal component around both ends of the curve P.

Specifically, the function of the frequency-detection-circuit 29 is such that it outputs a voltage to a gain-control-circuit 31 when the signal being input into the frequency-detection-circuit 29 includes the signal component around both ends of the curve P, which is disposed within "the frequency bands of difficult separation". The frequency detection circuit 29 is a sort of a control signal generator.

The gain-control-circuit 31 controls the gain of the signal from the second subtracting-circuit 27 based on a voltage input from the frequency-detection-circuit 29. Then, the gain-control-circuit 31 output a signal to the second selector 35. Specifically, the gain-control-circuit 31 reduces the gain of the signal from the second subtracting-circuit 27 when a voltage is input from the frequency-detection-circuit 29. The gain-control circuit is composed of, for example, an adder circuit or a dividing circuit.

The first selector 33 chooses a signal to be output between the signal from the first subtracting-circuit 23 and the signal from the adder circuit 25 based on information on a signal from the correlation-determination-circuit 17. Specifically, the signal from the first subtracting-circuit 23 is output to the luminance-signal-output-terminal 37 when the "OFF" signal comes from the correlation-determination-circuit 17. When the "ON" signal comes from the correlation-determination-circuit 17, the signal from the adder circuit 25 is output to the luminance-signal-output-terminal 37.

The second selector 35 also chooses a signal to be output between the signal from the BPF 18 and the signal from the gain-control-circuit 31 based on information of a signal from the correlation-determination-circuit 17. Specifically, the signal from the BPF 18 is output to the color-signal-output-terminal 39 when "OFF" signal comes from the correlation determination circuit 17. When the "ON" signal comes from the correlation determination circuit 1, the signal from the gain-control-circuit 31 is output to the color-signal-output-terminal 39.

The luminance-signal-output-terminal 37 is able to output the signal from the first selector 33. The color-signal-output-terminal 39 is able to output the signal from the second selector 35.

The signal separator 1 operates as follows.

The separation of the color-signal from the composite-video-signal by the BPF 18 gives the color signal. The subtraction of the color signal from the composite-video-signal by the subtracting-circuit 23 gives the luminance signal.

An addition of composite video signals between lines cancels a color signal component and produces a signal only including a luminance-signal component in the case of little differences of the composite video signal between the lines (i.e., when a correlation value given in the correlation-determination-circuit 17 exceeds a threshold value). This is because color signal components within composite-video-signals are opposite phases between the lines. Thus a luminance signal is output from the adder-circuit 25.

A subtraction of composite-video-signals between lines removes a luminance signal component and produces a color signal of twice amplitude in the case of little differences of the composite video signal between the lines (i.e., when a correlation given by the correlation-determination-circuit 17 exceeds a threshold value). Therefore a color signal is output from the second subtracting-circuit 27.

The frequency-detection-circuit 29 detects a frequency-band of the luminance-signal from the adder-circuit 25. Based on information of a signal from the frequency-detection-band 29, a level of the color signal from the second subtracting-circuit 27 is controlled.

The signal-separator 1 includes the following two circuits. The one is a BPF circuit having the BPF 18 and the first subtracting-circuit 23. The BPF circuit corresponds to "BPF CIR." in FIG. 1. The other is a reformed comb filter circuit having the adder-circuit 25, the second subtracting-circuit, the frequency-detection-circuit 29 and the gain-control-circuit 31. The reformed comb filter circuit corresponds to "FILTER CIR." in FIG. 1. The output signal of the correlation-determination-circuit 17 chooses the circuit for outputting desired signals between the BPF circuit and the reformed comb filter circuit. Thus, the characteristic advantages of each circuit are available.

The reformed comb filter circuit reduces a level of the color signal when a part of the luminance signal is within "the frequency bands of difficult separation". Conventionally, a color signal is superimposed on a luminance signal when a part of the luminance signal is within "the frequency bands of difficult separation" so that the color signal may not be separated sufficiently. However, the reduction of the color-signal-level is able to let audiences hardly recognize the quality loss of video due to cross color.

(Second Embodiment)

Figure 3:
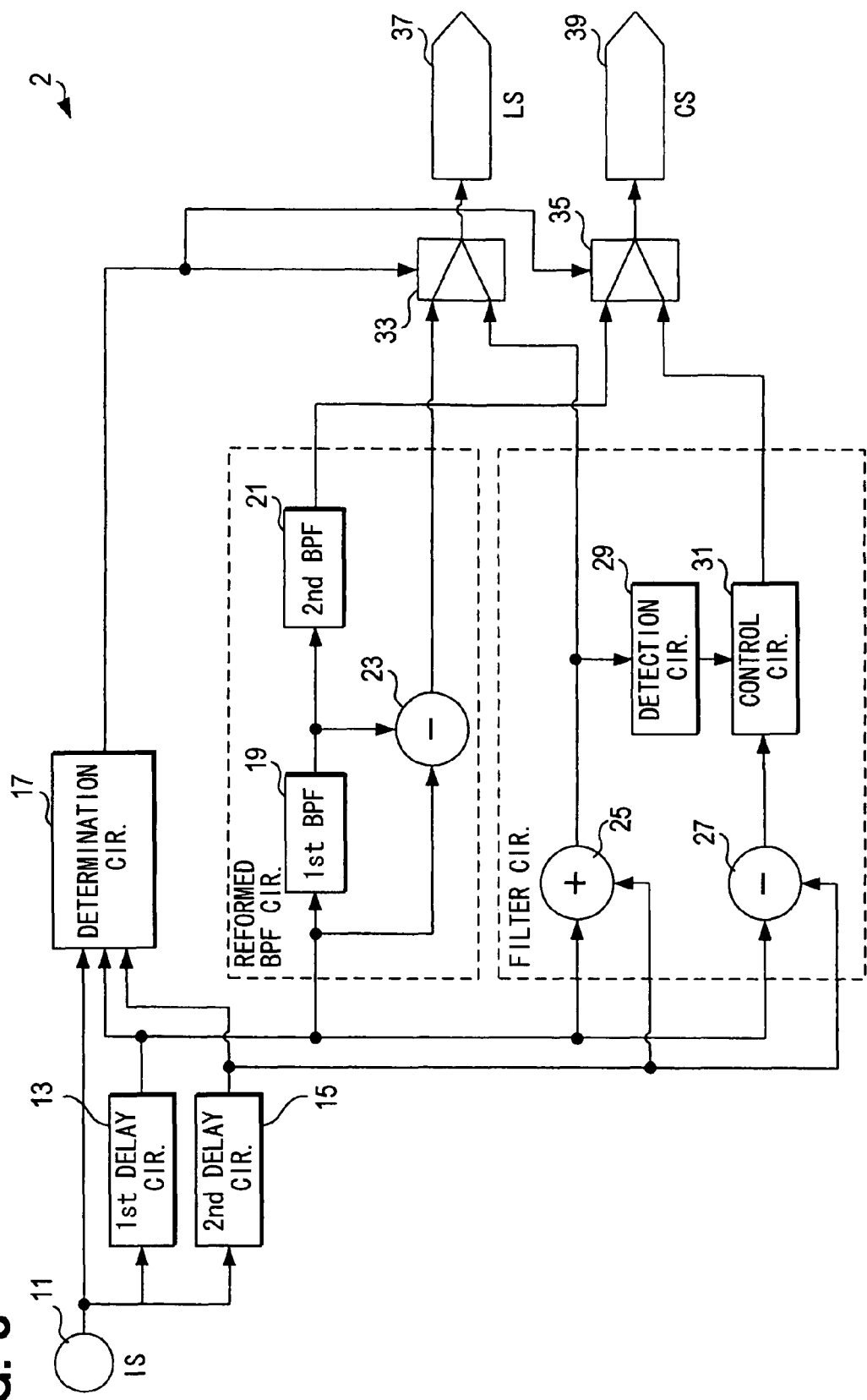
FIG. 3 is a schematic block diagram of a signal separator 2 according to a second embodiment.

FIG. 3 shows a schematic block diagram of a signal separator 2. The main differences between the signal separator 1 of the first embodiment and the signal separator 2 of the second embodiment are as follows. The BPF 18 is replaced by a first BPF 19. A second BPF 21 is newly placed on the latter part of the first BPF 19. A signal from the second BPF 21 is output to the second selector 35.

Figure 4A:
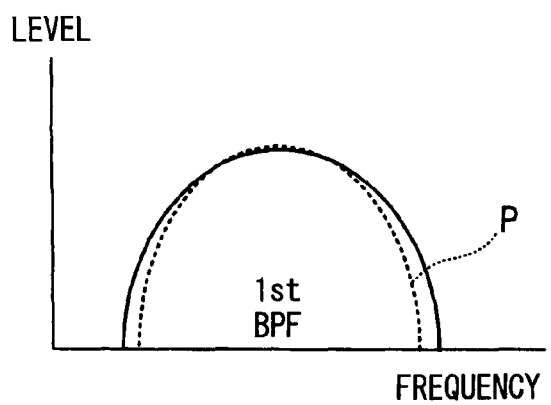
FIGS. 4A and 4B are graphs explaining characteristics of a first and a second BPFs.

FIG. 4A shows a frequency characteristic of the first BPF 19. The frequency characteristic of the first BPF 19 is slightly wider than that shown as the curve P in FIG. 2A. Therefore, the first BPF 19 passes a signal component within "the frequency bands of the difficult separation". If a frequency characteristic of the first BPF 19 is too much wider than that shown as the curve P, too much luminance signal components are removed. This means that the luminance signal components are excessively eliminated, and therefore, necessary components may be eliminated. Thus, it is necessary to select a filter having an optimal characteristic in taking into account the size of a screen etc.

Figure 4B:
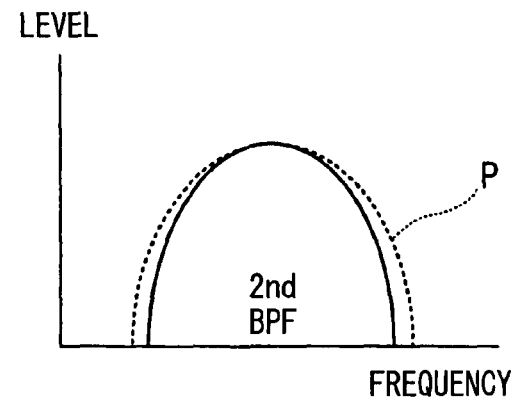

FIG. 4B shows a frequency characteristic of the second BPF 21. The frequency characteristic of the second BPF 21 is slightly narrower than that shown as the curve P in FIG. 2A. Therefore, the second BPF 21 passes a signal component outside "the frequency bands of difficult separation". If a frequency characteristic of the second BPF 21 is too much narrower than that shown as the curve P, too much color signal components are removed. This means that the color signal components are excessively eliminated, and therefore, necessary components may be eliminated. Thus, it is necessary to select a filter having an optimal characteristic in taking into account the size of screen etc.

The signal separator 2 operates as follows.

The first BPF 19 outputs a signal including a signal component within "the frequency bands of difficult separation" (see FIG. 4B). The second BPF 21 removes the signal component within "the frequency bands of difficult separation" from the color signal including the signal component within "the frequency bands of difficult separation". Thus, the two BPFs produce a color signal that does not include the signal component within "the frequency bands of difficult separation".

The first subtracting circuit 23 outputs a signal that does not include the signal component within "the frequency bands of difficult separation" because the first subtracting circuit 23 subtracts the output signal of the first BPF (which includes the signal component within "the frequency bands of difficult separation") from the composite video signal.

A circuit having the first BPF 19, the second BPF 21 and first subtracting circuit 23 (i.e., a reformed comb filter circuit) outputs the color and the luminance signals that do not include the signal component within "the frequency bands of difficult separation". This filter circuit suppresses cross color and dot interference more than a conventional circuit.

The frequency detection circuit 29 detects a frequency band of the luminance signal from the adder circuit 25. An output signal of the frequency detection circuit 29 determines the reduction level of the color signals, which is the output signal of the second subtracting circuit 27.

Conventionally, at the moment that a part of the luminance signal is within "the frequency bands of difficult separation", a wrong signal is given in many cases. This is because a signal component of the color signal overlaps a luminance signal band. However, the reduction of the color signal level is able to let audiences hardly recognize the quality loss of video due to cross color.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A signal separator for separating a luminance signal and a color signal from a composite video signal, the separator comprising:
    a first line delay element for delaying the composite video signal by one line period, and outputting a delayed signal as a first delay signal;
    a second line delay element for delaying the composite video signal by two line periods, and outputting a delayed signal as a second delay signal;
    a correlation determination element for determining a correlation among the composite video signal, the first delay signal and the second delay signal, and outputting a determined correlation as a correlation signal;
    a first band pass element for passing a part of the first delay signal within the predetermined frequency band and within a color signal band, and outputting a filtered signal as a first filtered signal;

a second band pass element for passing a part of the first filtered signal within the color signal band and without the predetermined frequency band, and outputting a filtered signal as a second filtered signal;

a first subtraction element for subtracting the first filtered signal from the first delay signal, and outputting a subtracted signal as a first subtraction signal;

an adder element for adding the first and second delay signals, and outputting an added signal as a addition signal;

a second subtraction element for subtracting the second delay signal from the first delay signal, and outputting a subtracted signal as a second subtraction signal;

a control signal generator for passing a part of the addition signal within a predetermined frequency band therethrough, and outputting a filtered signal as a control signal;

a gain control element for reducing a level of the second subtraction signal based on the control signal, and outputting a reduced signal as a gain-controlled signal;

a first selector for selecting one of the first subtraction signal and the addition signal based on the correlation signal, and outputting a selected signal as the luminance signal; and a second selector for selecting one of the gain-controlled signal and the second filtered signal based on the correlation signal, and outputting a selected signal as the color signal.

* * * * *